US010889667B2

(12) United States Patent
Park et al.

(10) Patent No.: US 10,889,667 B2
(45) Date of Patent: Jan. 12, 2021

(54) HIGH-STIFFNESS AND ENERGY-REDUCING POLYPROPYLENE FOR FOAMING

(71) Applicant: LG CHEM, LTD., Seoul (KR)

(72) Inventors: Jin Hyun Park, Daejeon (KR); Ji Ho Choi, Daejeon (KR); Kyung Seop Noh, Daejeon (KR); Sang Jin Jeon, Daejeon (KR); Sang Eun An, Daejeon (KR); Ra Yun Choi, Daejeon (KR); In Sun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 231 days.

(21) Appl. No.: 15/749,249

(22) PCT Filed: Feb. 13, 2017

(86) PCT No.: PCT/KR2017/001551
§ 371 (c)(1),
(2) Date: Jan. 31, 2018

(87) PCT Pub. No.: WO2017/142273
PCT Pub. Date: Aug. 24, 2017

(65) Prior Publication Data
US 2018/0223013 A1 Aug. 9, 2018

(30) Foreign Application Priority Data
Feb. 17, 2016 (KR) .................. 10-2016-0018661

(51) Int. Cl.
C08F 10/06 (2006.01)
C08F 110/06 (2006.01)
C08F 4/659 (2006.01)
C08F 4/6592 (2006.01)
C08F 10/02 (2006.01)

(52) U.S. Cl.
CPC .......... C08F 10/06 (2013.01); C08F 4/65912 (2013.01); C08F 4/65927 (2013.01); C08F 10/02 (2013.01); C08F 110/06 (2013.01); C08F 2500/01 (2013.01); C08F 2500/03 (2013.01)

(58) Field of Classification Search
USPC .................................................. 526/114, 351
See application file for complete search history.

(56) References Cited

U.S. PATENT DOCUMENTS

| | | |
|---|---|---|
| 7,193,025 B2 | 3/2007 | Maziers et al. |
| 8,329,825 B2 | 12/2012 | Mori et al. |
| 9,587,053 B2 | 3/2017 | Noh et al. |
| 9,771,441 B2 | 9/2017 | Choi et al. |
| 2005/0203260 A1 | 9/2005 | Xu et al. |
| 2006/0116490 A1 | 6/2006 | Paczkowski et al. |
| 2009/0274921 A1 | 11/2009 | Ackermans et al. |
| 2010/0137466 A1 | 6/2010 | Sasaki et al. |
| 2013/0302629 A1 | 11/2013 | Ciarafoni et al. |
| 2016/0137881 A1 | 5/2016 | Oota et al. |
| 2017/0044278 A1 | 2/2017 | Lee et al. |

FOREIGN PATENT DOCUMENTS

| | | |
|---|---|---|
| CN | 101367974 A | 2/2009 |
| CN | 101573231 A | 11/2009 |
| CN | 101679662 A | 3/2010 |
| CN | 103097419 A | 5/2013 |
| CN | 105131325 A | 12/2015 |
| EP | 0074194 B1 | 11/1986 |
| EP | 2 648 191 A1 | 10/2013 |
| EP | 3 034 521 A1 | 6/2016 |
| JP | 11-349618 A | 12/1999 |
| JP | 11-349649 A | 12/1999 |
| JP | 3550897 B2 | 8/2004 |
| JP | 2007-131863 A | 5/2007 |
| JP | 2008-265307 A | 11/2008 |
| JP | 2010-248341 A | 11/2010 |
| JP | 2011-016914 A | 1/2011 |
| JP | 4813811 B2 | 11/2011 |
| JP | 2015-193827 A | 11/2015 |
| KR | 10-0658136 B1 | 12/2006 |
| KR | 10-2008-0085860 A | 9/2008 |
| KR | 10-0987085 B1 | 10/2010 |
| KR | 10-1354477 B1 | 1/2014 |
| KR | 10-2014-0133343 A | 11/2014 |
| KR | 10-2015-0037652 A | 4/2015 |
| KR | 10-2015-0037653 A | 4/2015 |
| KR | 10-2015-0037654 A | 4/2015 |
| KR | 10-2015-0052803 A | 5/2015 |
| KR | 10-2015-0052804 A | 5/2015 |
| KR | 10-2015-0144281 A | 12/2015 |
| KR | 10-2016-0018661 A | 2/2016 |
| KR | 10-2016-0057930 A | 5/2016 |
| KR | 10-2017-0056462 A | 5/2017 |
| KR | 10-1737568 B1 | 5/2017 |
| KR | 10-2017-0094671 A | 8/2017 |

(Continued)

OTHER PUBLICATIONS

ASTM Designation: D 790-03: Standard Test Methods for Flexural Properties of Unreinforced and Reinforced Plastics and Electrical Insulating Materials, pp. 1-11, Published Apr. 2003 (Copyright (c) ASTM International, PA). (Year: 2003).*

Machine translation of KR 10-2016-0057930 retrieved from K-PION; publication date: May 24, 2016. (Year: 2016).*

ASTM Designation D1238-10; Standard Test Method for Melt Flow Rates of Thermoplastics by Extrusion Plastometer, pp. 1-15, Current edition approved Feb. 1, 2010; Published Mar. 2010. (Year: 2010).*

LG Chem: "Material Safety Data Sheet, Propylene-Ethylene Copolymer R3410", XP055498039, LG Chem, Ltd. Daesan Plant, Jun. 10, 2010, pp. 1-6.

Letter by Noritaka Ishii, Marketing Group, Global Business Department, Japan Polypropylene Corporation to Borealis AG and Borealis Polyolefine GmbH, dated Mar. 10, 2020, 1p.

(Continued)

Primary Examiner — Fred M Teskin
(74) Attorney, Agent, or Firm — Dentons US LLP

(57) ABSTRACT

The present invention relates to a polypropylene having excellent stiffness and achieving energy reduction during foaming.

5 Claims, No Drawings

(56) References Cited

FOREIGN PATENT DOCUMENTS

| WO | 2008-074699 A1 | 6/2008 |
| WO | 2012-013761 A1 | 2/2012 |
| WO | 2014/187687 A1 | 11/2014 |

OTHER PUBLICATIONS

Declaration by Markus Gahleitner concerning properties of Wintec WFW4 lot #C52709, received as a sample from commercial production in Jul. 2010, dated Mar. 10, 2020, 2 pp.
Grasmeder: "Metallocene Polypropylene: Technology and Application" Paper No. 2 of "Metallocene Technology", A One-Day Seminar held at Rapra Technology Limited, Shawbury, Shrewsbury, Shropshire, SY4, 4NR, UK, Sep. 2, 1997, pp. 1-5.

\* cited by examiner

HIGH-STIFFNESS AND ENERGY-REDUCING POLYPROPYLENE FOR FOAMING

CROSS-REFERENCE TO RELATED APPLICATION(S)

This application is the national stage of International Application No. PCT/KR2017/001551 filed on Feb. 13, 2017, and claims the benefit of Korean Application No. 10-2016-0018661 filed on Feb. 17, 2016, all of which are hereby incorporated by reference in their entirety for all purposes as if fully set forth herein.

TECHNICAL FIELD

The present invention relates to a polypropylene having excellent stiffness and achieving energy reduction during foaming.

BACKGROUND ART

The catalyst system for olefin polymerization may be classified into Zeigler-Natta catalyst system and metallocene catalyst system, and these two highly active catalyst systems have been respectively developed according to their characteristics. Zeigler-Natta catalyst had been widely used in prior commercial processes since it was invented in 1950's, but it was characterized in that the molecular weight distribution of the polymers obtained by using the same was wide because it is a multi-site catalyst having a plurality of active sites and thus there was a problem that the composition distribution of the comonomers in the polymer was not even and there was a limitation in securing the desired properties.

Metallocene catalyst consists of a combination of a main catalyst whose main component is a transition metal compound and a cocatalyst which is an organometallic compound whose main component is aluminum. Such catalyst is a homogeneous complex catalyst and a single site catalyst. The polymer of which the molecular weight distribution is narrow and the composition distribution of the comonomers is even can be obtained by using the same due to the single site characteristic, and the stereoregularity, the copolymerization characteristics, the molecular weight, the crystallinity degree, and so on of the polymer can be changed by varying the ligand structure of the catalyst and the polymerization conditions.

Meanwhile, an ansa-metallocene compound is an organometal compound having two ligands which are connected to each other by a bridge group, wherein the rotation of the ligands is prevented and the activity and the structure of the metal center are determined by the bridge group.

Such ansa-metallocene compound is being used as a catalyst for preparing an olefinic homopolymer or copolymer. Particularly, it is known that a high molecular weight polyethylene can be prepared by using an ansa-metallocene compound including a cyclopentadienyl-fluorenyl ligand, and thereby the microstructure of polypropylene can be controlled. Furthermore, it is known that the ansa-metallocene compound having an indenyl ligand has excellent activity and can be used to prepare a polyolefin having an enhanced stereoregularity.

Meanwhile, expanded polypropylene (EPP) produced by foaming polypropylene is used as a material of a product which requires lightness and stiffness, such as automobile bumpers, interior material, helmets, and the like. The processing temperature for producing the expanded polypropylene is closely related to the melting point of polypropylene, and therefore a material having a low melting point of polypropylene and excellent stiffness is required. In general, the polypropylene produced by Ziegler-Natta catalyst has a high melting point despite its excellent stiffness, so that a high temperature is required for the production of the expanded polypropylene, and thus there is a problem that a lot of energy is consumed and the price rises.

Therefore, the present inventors have conducted extensive studies and found that a polypropylene having a high stiffness while lowering the melting point can be produced by using a metallocene catalyst having a specific structure instead of a Ziegler-Natta catalyst, thereby completing the present invention.

DETAILED DESCRIPTION OF THE INVENTION

Technical Problem

It is an object of the present invention to provide a polypropylene having excellent stiffness and achieving energy reduction during foaming.

Technical Solution

In order to achieve the above object, the present invention provides a polyethylene which satisfies the following features:

MI (measured at 230° C. under a load of 2.16 kg according to ASTM D1238) of 4 to 60 g/10 min, a melting point (Tm) of 120° C. to 150° C., and a flexural modulus (measured according to ASTM D 790) of 9,000 to 18,000 kgf/cm$^2$.

The term "polypropylene" as used herein means a propylene homopolymer or a propylene/ethylene copolymer produced by polymerizing propylene. The "polypropylene" produced by the present invention is produced by performing a polymerization under a metallocene catalyst described later, and has a feature that it has a molecular weight distribution (Mw/Mn) of 2.0 to 3.5. In general, polypropylene prepared with a Ziegler-Natta catalyst exhibits a wide molecular weight distribution, and thus can be distinguished from polypropylene produced with a Ziegler-Natta catalyst according to the molecular weight distribution. More preferably, the molecular weight distribution is 2.3 to 3.3.

The polypropylene according to the present invention has an advantage that the melting point (Tm) is as low as 130° C. to 140° C. and an amount of use of energy during production of expanded polypropylene is reduced. Further, despite the low melting point as mentioned above, the flexural modulus appears high, 9,000 to 18,000 kgf/cm$^2$.

According to one example and a comparative example of the present invention, polypropylene produced with a Ziegler-Natta catalyst has a melting point of more than 140° C. and thus requires a lot of energy for producing expanded polypropylene, whereas polypropylene produced according to the present invention has high flexural modulus while having low melting point.

Preferably, the MI is 6 or more, 20 or less, 19 or less, 18 or less, 17 or less, or 16 or less.

Preferably, the polypropylene according to the present invention has a weight average molecular weight of 150,000 to 350,000.

Further, preferably, the polypropylene according to the present invention has a crystallization temperature (Tc) of 80 to 105° C.

Further, the flexural strength (measured according to ASTM D790) is preferably 300 to 400%.

In addition, the polypropylene according to the present invention can be produced by polymerizing propylene in the presence of a hybrid supported catalyst comprising a compound represented by the following Chemical Formula 1, a compound represented by the following Chemical Formula 2 and a support:

[Chemical Formula 1]

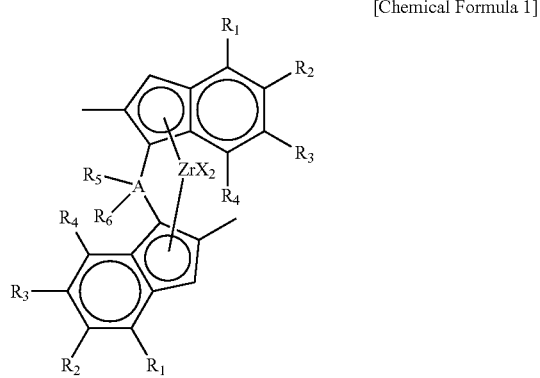

in Chemical Formula 1,
X' is halogen, same as or different from each other,
$R_1$ is $C_{6-20}$ aryl substituted with $C_{1-20}$ alkyl,
$R_2$, $R_3$ and $R_4$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl,
A is carbon, silicon, or germanium,
$R_5$ is $C_{1-20}$ alkyl substituted with $C_{1-20}$ alkoxy, and
$R_6$ is hydrogen, $C_{1-20}$ alkyl, or $C_{2-20}$ alkenyl,

[Chemical Formula 2]

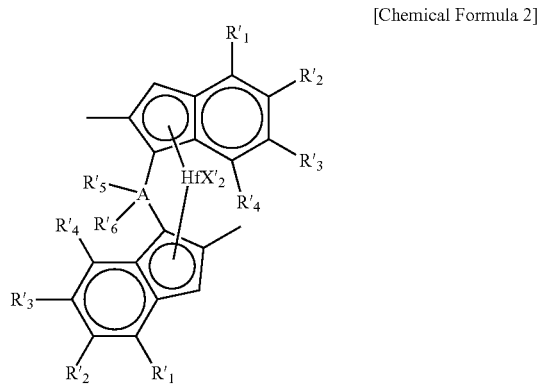

in Chemical Formula 2,
X is halogen, same as or different from each other,
$R'_1$ is $C_{6-20}$ aryl substituted with $C_{1-20}$ alkyl,
$R'_2$, $R'_3$ and $R'_4$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl,
A is carbon, silicon, or germanium,
$R'_5$ is $C_{1-20}$ alkyl substituted with $C_{1-20}$ alkoxy, and
$R'_6$ is hydrogen, $C_{1-20}$ alkyl, or $C_{2-20}$ alkenyl.

The molar ratio between the compound represented by Formula 1 and the compound represented by Formula 2 is preferably 2:1 to 1:5. The optimum catalytic activity and physical properties exhibit at the above molar ratio, and thus it may be advantageous from the viewpoints of the maintenance of the catalyst activity and the economic efficiency.

In Chemical Formula 1, preferably, $R_1$ is phenyl substituted with tert-butyl. More preferably, $R_1$ is 4-tert-butylphenyl.

Further, preferably, $R_2$, $R_3$ and $R_4$ are hydrogen.

Further, preferably, A is silicon.

Further, preferably, $R_5$ is 6-tert-butoxy-hexyl and $R_6$ is methyl.

The representative example of the compound represented by Chemical Formula 1 is as follows:

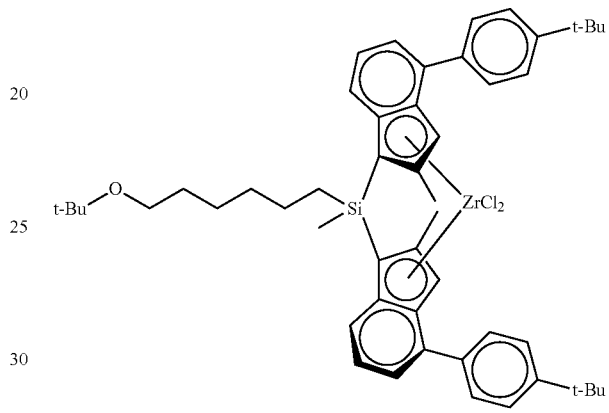

The present invention also provides a method for preparing a compound represented by Chemical Formula 1 as shown in the following Reaction Scheme 1:

[Reaction Scheme 1]

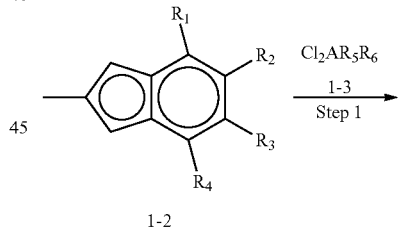

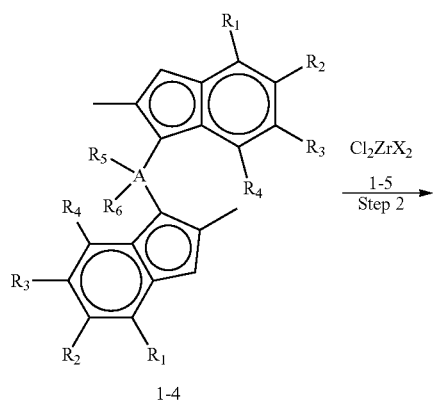

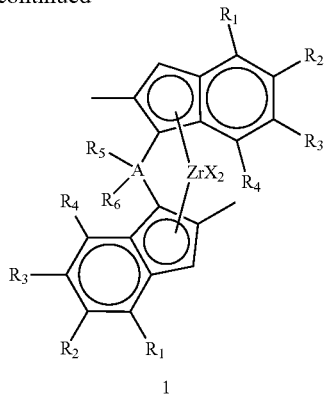

1

The step 1 is a step of preparing a compound represented by Chemical Formula 1-4 by reacting a compound represented by Chemical Formula 1-2 with a compound represented by Chemical Formula 1-3. It is preferable to use an alkyllithium (for example, n-butyllithium) in the reaction, and the reaction temperature is −200 to 0° C., preferably −150 to 0° C. Toluene, THF, and the like may be used as the solvent. At this time, the steps of separating an organic layer from the product, vacuum-drying the separated organic layer, and eliminating an excess of the reactant therefrom may be further carried out.

The step 2 is a step of preparing a compound represented by Chemical Formula 1 by reacting a compound represented by Chemical Formula 1-4 with a compound represented by Chemical Formula 1-5. It is preferable to use an alkyllithium (for example, n-butyllithium) in the reaction, and the reaction temperature is −200 to 0° C., more preferably −150 to 0° C. Ether, hexane, and the like may be used as the solvent.

In Chemical Formula 2, preferably, $R'_1$ is phenyl substituted with tert-butyl. More preferably, $R'_1$ is 4-tert-butylphenyl.

Further, preferably, $R'_2$, $R'_3$ and $R'_4$ are hydrogen.
Further, preferably, A' is silicon.
Further, preferably, $R'_5$ is 6-tert-butoxy-hexyl and $R'_6$ is methyl.

The representative example of the compound represented by Chemical Formula 2 is as follows:

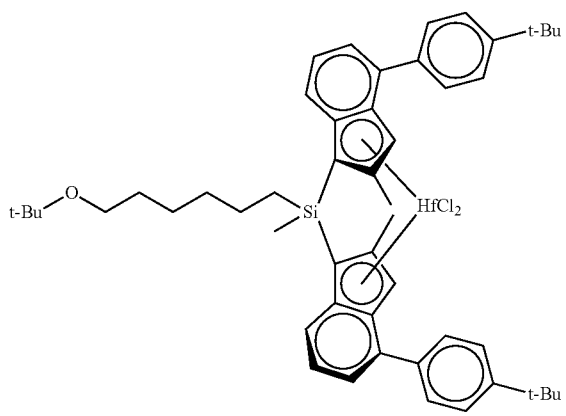

The present invention also provides a method for preparing a compound represented by Chemical Formula 2 as shown in the following Reaction Scheme 2:

[Reaction Scheme 2]

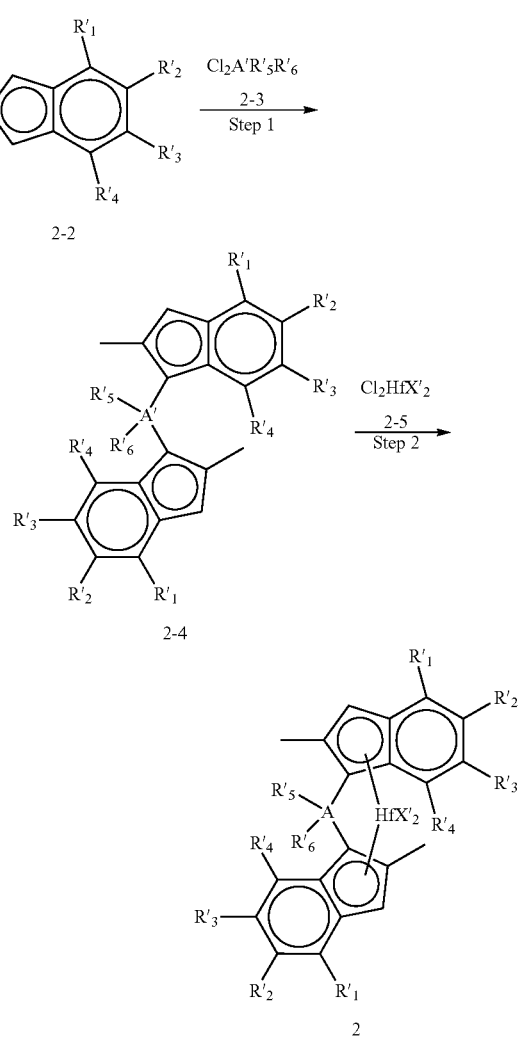

The step 1 is a step of preparing a compound represented by Chemical Formula 2-4 by reacting a compound represented by Chemical Formula 2-2 with a compound represented by Chemical Formula 2-3. It is preferable to use an alkyllithium (for example, n-butyllithium) in the reaction, and the reaction temperature is −200 to 0° C., more preferably −150 to 0° C. Toluene, THF, and the like may be used as the solvent. At this time, the steps of separating an organic layer from the product, vacuum-drying the separated organic layer, and eliminating an excess of the reactant therefrom may be further carried out.

The step 2 is a step of preparing a compound represented by Chemical Formula 2 by reacting a compound represented by Chemical Formula 2-4 with a compound represented by Chemical Formula 2-5. It is preferable to use an alkyllithium (for example, n-butyllithium) in the reaction, and the reaction temperature is −200 to 0° C., more preferably −150 to 0° C. Ether, hexane, and the like may be used as the solvent.

It is also preferred that X and X', $R_1$ and $R'_1$, $R_2$ and $R'_2$, $R_3$ and $R'_3$, $R_4$ and $R'_4$, A and A', $R_5$ and $R'_5$, and $R_6$ and $R'_6$ are identical to each other, respectively. That is, it is preferable that only the metal atom has a different structure in the compound represented by Chemical Formula 1 and the compound represented by Chemical Formula 2.

In the hybrid supported catalyst according to the present invention, as the support, a support containing a hydroxy group on its surface can be used, and preferably a support having highly reactive hydroxy group and siloxane group, of which the surface is dried and removed of moisture can be used. For example, silica, silica-alumina, silica-magnesia or the like, which are dried at high temperature, can be used, and they may typically contain oxides, carbonates, sulfates, and nitrates such as $Na_2O$, $K_2CO_3$, $BaSO_4$ and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

In the hybrid supported catalyst according to the present invention, the mass ratio between the catalyst (the compound represented by Chemical Formula 1 and the compound represented by Chemical Formula 2) and the support is preferably 1:10 to 1:1000. When the support and the catalyst are contained in the range of the above mass ratio, they may exhibit proper supported catalyst activity, which may be advantageous in terms of the maintenance of the catalyst activity and the economic efficiency.

In addition to the catalyst, a cocatalyst may be further used to prepare the olefinic polymer. The cocatalyst may further include at least one of the cocatalyst compounds represented by the following Chemical Formula 3, Chemical Formula 4 and Chemical Formula 5.

$$—[Al(R_{30})—O]_m—$$ [Chemical Formula 3]

in Chemical Formula 3, $R_{30}$ may be the same as or different from each other, and each independently halogen; a hydrocarbon having 1 to 20 carbon atoms; or a halogen-substituted hydrocarbyl group having 1 to 20 carbon atoms, and m is an integer of 2 or more, $$J[R_{31}]_3$$ [Chemical Formula 4]

in Chemical Formula 4, $R_{31}$ may be the same as or different from each other, and each independently halogen; a hydrocarbon having 1 to 20 carbon atoms; a hydrocarbyoxy; an alkoxy; or a halogen-substituted hydrocarbyl group having 1 to 20 carbon atoms; and J is aluminum or boron;

$$[E-H]^+[ZA_4]^- \text{ or } [E]^+[ZA_4]^-$$ [Chemical Formula 5]

in Chemical Formula 5,

E is a neutral or cationic Lewis base;

H is a hydrogen atom;

Z is a Group 13 element; and

A may be the same as or different from each other, and each independently an aryl group having 6 to 20 carbon atoms or an alkyl group having 1 to 20 carbon atoms in which at least one halogen is substituted or unsubstituted with halogen, $C_1$-$C_{20}$ hydrocarbon, alkoxy or phenoxy.

Examples of the compound represented by Chemical Formula 3 include methylaluminoxane, ethylaluminoxane, isobutylaluminoxane, butylaluminoxane, and the like, and a more preferred compound is methylaluminoxane.

Examples of the compound represented by Chemical Formula 4 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentyl aluminum, triisopentyl aluminum, trihexyl aluminum, trioctyl aluminum, ethyl dimethyl aluminum, methyldiethyl aluminum, triphenyl aluminum, tri-p-tolyl aluminum, dimethyl aluminum methoxide, dimethyl aluminum ethoxide, trimethyl boron, triethylboron, triisobutylboron, tripropylboron, tributylboron and the like, and more preferred compounds are selected among trimethylaluminum, triethylaluminum, and triisobutylaluminum.

Examples of the compound represented by Chemical Formula 5 include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl)boron, tributylammoniumtetra(p-trifluoromethylphenyl)boron, triphenylcarboniumtetra(p-trifluoromethylphenyl)boron, triphenylcarboniumtetrapentafluorophenylboron, and the like.

The hybrid supported catalyst according to the present invention can be prepared by a method comprising a step of supporting a cocatalyst compound on a support, a step of supporting the compound represented by Chemical Formula 1 on the support, and a step of supporting the compound represented by Chemical Formula 2 on the support, and the order of supporting can be changed as needed.

In the preparation of the hybrid supported catalyst, a hydrocarbon-based solvent such as pentane, hexane, heptane or the like or an aromatic solvent such as benzene, toluene or the like may be used as a reaction solvent. In addition, the metallocene compound and the cocatalyst compound may be used in the form supported on silica or alumina.

In addition, the present invention provides a method for preparing a polypropylene according to the present invention, comprising a step of polymerizing propylene in the presence of the hybrid supported catalyst.

In the method for preparing a polypropylene according to the present invention, in addition to the above propylene, ethylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene and the like can be additionally used, and two or more of these can be mixed and copolymerized. Preferably, the polypropylene according to the present invention is a propylene homopolymer, a random copolymer of propylene and ethylene, or a terpolymer of ethylene, propylene and $C_4$-$C_8$ olefin (in particular, 1-butene).

The polymerization reaction may be carried out by homopolymerizing one olefinic monomer or copolymerizing two or more monomers, using a continuous slurry polymerization reactor, a loop slurry reactor, a gas phase reactor, or a solution reactor.

The hybrid supported catalyst may be injected after being dissolved or diluted in an aliphatic hydrocarbon solvent having 5 to 12 carbon atoms such as pentane, hexane, heptane, nonane, decane and an isomer thereof, an aromatic hydrocarbon solvent such as toluene and benzene, or a hydrocarbon solvent substituted with a chlorine atom such as dichloromethane and chlorobenzene. It is preferable that the solvent is used after a small amount of water, air or the like acting as a catalyst poison is removed by treating with a small amount of alkyl aluminum. It may also be performed by further using a cocatalyst.

Here, the polymerization may be carried out at a temperature of 25 to 500° C. under a pressure of 1 to 100 kgf/cm² for 1 to 24 hours. In this case, the polymerization reaction temperature is preferably 25 to 200° C., and more preferably 50 to 150° C. Further, the polymerization reaction pressure is preferably from 1 to 70 kgf/cm², more preferably from 5 to 40 kgf/cm². The polymerization reaction time is preferably 1 to 5 hours.

The polymerization process can control the molecular weight range of the finally produced polypropylene according to whether hydrogen is added thereto or not. Particularly, the polypropylene of high molecular weight can be prepared under a condition in which hydrogen is not added thereto, and the polypropylene of low molecular weight can be prepared even by addition of a small quantity of hydrogen when hydrogen is added thereto. In this case, the amount of hydrogen added to the polymerization process may range from 0.07 L to 4 L under the reactor condition of 1 atm, or hydrogen may be provided to the reactor with the pressure of 1 to 40 bar, or may be provided in the range of the molar ratio between hydrogen and olefinic monomer of 168 ppm to 8,000 ppm.

Further, the present invention provides expandable polypropylene (EPP) comprising a polypropylene according to the present invention. Generally, the expandable polypropylene comprises at least 95% by weight of the polypropylene according to the present invention, preferably the expandable polypropylene is composed of the polypropylene according to the present invention.

As a method for preparing an expandable polypropylene, a method commonly used in the technical field to which the present invention belongs can be used, except that the polypropylene according to the present invention is used. For example, the expandable polypropylene can be prepared by a batch method. Specifically, the expandable polypropylene can be prepared by a method comprising: a step mixing polypropylene and other additives for imparting functionality; a step of uniformly dispersing the mixed raw materials and extruding them into pellets of a certain size; a step of adding pellets to the batch, adding water, a dispersing agent, a foaming agent, etc., raising the temperature and pressurizing to discharge the bead-shaped foam; a washing step of removing foreign matters on the bead surface, and a drying step of removing moisture. Further, in order to produce the final product, the bead is injected into the final product mold and fused with high temperature steam to obtain a foamed product as the final finished product.

Advantageous Effects

As described above, the polypropylene according to the present invention is characterized in that it has excellent stiffness and has a low melting point, thus achieving energy reduction during foaming.

DETAILED DESCRIPTION OF THE EMBODIMENTS

Hereinafter, preferred Examples are provided for better understanding of the present invention. However, these Examples are provided for illustrative purposes only and the invention are not intended to be limited by these Examples.

PREPARATION EXAMPLE 1

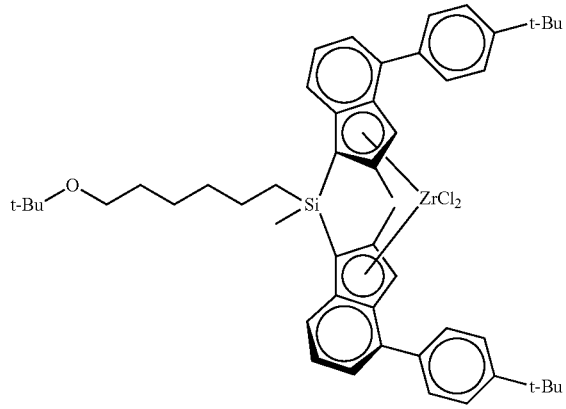

Step 1) Preparation of (6-t-butoxyhexyl)(methyl)-bis(2-methyl-4-tert-butylphenylindenyl)silane 2-Methyl-4-tert-butylphenylindene (20.0 g, 76 mmol) was dissolved in a toluene/THF=10/1 solution (230 mL), and then n-butyllithium solution (2.5 M, hexane solvent, 22 g) was slowly added dropwise at 0° C. and then stirred at room temperature for 1 day. Then, (6-t-butoxyhexyl)dichloromethylsilane (1.27 g) was slowly added dropwise to the mixed solution at −78° C. After stirring for about 10 minutes, the mixture was stirred at room temperature for 1 day. Then, water was added to separate an organic layer, and the solvent was distilled under reduced pressure to obtain (6-t-butoxyhexyl)(methyl)-bis(2-methyl-4-tert-butyl-phenylindenyl)silane.

$^1$H NMR (500 MHz, CDCl$_3$, 7.26 ppm): −0.20-0.03 (3H, m), 1.26 (9H, s), 0.50-1.20 (4H, m), 1.20-1.31 (11H, m), 1.40-1.62 (20H, m), 2.19-2.23 (6H, m), 3.30-3.34 (2H, m), 3.73-3.83 (2H, m), 6.89-6.91 (2H, m), 7.19-7.61 (14H, m)

Step 2) Preparation of [(6-t-butoxyhexylmethylsilane-diyl)-bis(2-methyl-4-tert-butylphenylindenyl)]zirconium dichloride (6-t-butoxyhexyl)(methyl)-bis(2-methyl-4-tert-butylphenylindenyl)silane prepared in the step 1 was dissolved in a toluene/THF=5/1 solution (95 mL), and then a n-butyllithium solution (2.5M, hexane solvent, 22 g) was slowly added dropwise at −78° C., and the mixture was stirred at room temperature for 1 day. Bis(N,N'-diphenyl-1,3-propanediamido)dichlorazirconium bis(tetrahydrofuran) [Zr(C$_5$H$_6$NCH$_2$CH$_2$NC$_5$H$_6$)Cl$_2$(C$_4$H$_8$O)$_2$] was dissolved in toluene (229 mL) and then slowly added dropwise to the reaction solution at −78° C., and the mixture was stirred at room temperature for 1 day. After the reaction solution was cooled to −78° C., a HCl ether solution (1 M, 183 mL) was slowly added dropwise, and the mixture was stirred at 0° C. for 1 hour. After filtration and vacuum-drying, hexane was added thereto and stirred to precipitate crystals. The precipitated crystals were filtered off and dried under reduced pressure to obtain [(6-t-butoxyhexylmethylsilane-diyl)-bis(2-methyl-4-tert-butylphenylindenyl)]zirconium dichloride (20.5 g, 61% in total).

$^1$H NMR (500 MHz, CDCl$_3$, 7.26 ppm): 1.20 (9H, s), 1.27 (3H, s), 1.34 (18H, s), 1.20-1.90 (10H, m), 2.25 (3H, s), 2.26 (3H, s), 3.38 (2H, t), 7.00 (2H, s), 7.09-7.13 (2H, m), 7.38 (2H, d), 7.45 (4H, d), 7.58 (4H, d), 7.59 (2H, d), 7.65 (2H, d)

PREPARATION EXAMPLE 2

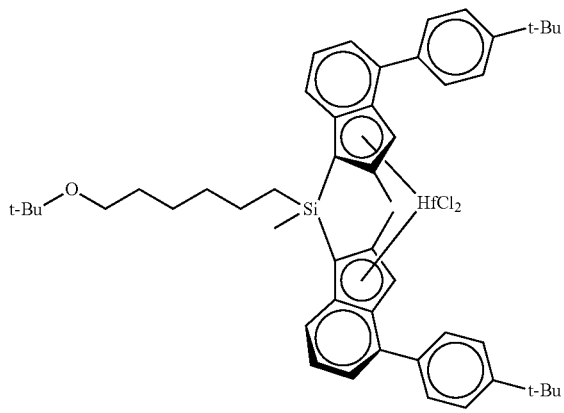

Step 1) Preparation of (6-t-butoxyhexyl)(methyl)-bis(2-methyl-4-(4-t-butylphenyl) indenyl))silane 150 g of 2-methyl-4-(4-t-butylphenyl)indene was added to a 3 L Schlenk flask and dissolved in a toluene/THF solution (10:1, 1.73 L) at room temperature. After cooling the solution to −20° C., 240 mL of n-butyllithium solution (n-BuLi, 2.5 M in hexane) was slowly added dropwise, and the mixture was stirred at room temperature for 3 hours. Then, the reaction solution was cooled to −20° C., and then 82 g of (6-t-butoxyhexyl)dichloromethylsilane and 512 mg of CuCN were slowly added dropwise. The reaction solution was warmed to room temperature, stirred for 12 hours, and 500 mL of water was added. Then, the organic layer was separated, dehydrated with MgSO$_4$ and filtered. The filtrate was distilled under reduced pressure to obtain the desired compound as yellow oil.

$^1$H NMR (500 MHz, CDCl$_3$, 7.26 ppm): −0.09--0.05 (3H, m), 0.40-0.60 (2H, m), 0.80-1.51 (26H, m), 2.12-2.36 (6H, m), 3.20-3.28 (2H, m), 3.67-3.76 (2H, m), 6.81-6.83 (2H, m), 7.10-7.51 (14H, m)

Step 2) Preparation of rac-[(6-t-butoxyhexylmethylsilanediyl)-bis(2-methyl-4-(4-t-butylphenyl)indenyl)]hafnium dichloride (6-t-butoxyhexyl)(methyl)-bis(2-methyl-4-(4-t-butylphenyl)indenyl))silane previously prepared was added to a 3 L Schlenk flask, and 1 L of ethyl ether was added thereto and dissolved at room temperature. The solution was cooled to −20° C. and then 240 mL of n-butyllithium solution (n-BuLi, 2.5 M in hexane) was slowly added dropwise and stirred at room temperature for 3 hours. Then, the reaction solution was cooled to −78° C., and 92 g of hafnium chloride was added thereto. The reaction solution was warmed to room temperature and then stirred for 12 hours, and the solvent was removed under reduced pressure. 1 L of dichloromethane was added, and then the insoluble inorganic salts and the like were removed by filtration. The filtrate was dried under reduced pressure, and again 300 mL of dichloromethane was added to precipitate crystals. The precipitated crystals were filtered off and dried to obtain 80 g of rac-[(6-t-butoxyhexylmethylsilanediyl)-bis(2-methyl-4-(4-t-butylphenyl)indenyl)]hafnium dichloride (Rac:meso=50:1).

$^1$H NMR(500 MHz, CDCl$_3$, 7.26 ppm): 1.19-1.78 (37H, m), 2.33 (3H, s), 2.34 (3H, s), 3.37 (2H, t), 6.91 (2H, s), 7.05-7.71 (14H, m)

PREPARATION EXAMPLE 3

3 g of silica L203F was preliminarily weighed in a Schlenk flask, and then 10 mmol of methylaluminoxane (MAO) was added thereto, followed by reaction at 95° C. for 24 hours. After precipitation, the upper layer was removed and washed once with toluene. 60 μmol of the compound prepared in Preparation Example 2 was dissolved in toluene and then reacted at 75° C. for 5 hours. When the precipitation was completed after the completion of the reaction, the upper layer solution was removed, and the remaining reaction product was washed once with toluene. Then, 20 μmol of the compound prepared in Preparation Example 1 was dissolved in toluene, and the mixture was further reacted at 75° C. for 2 hours. When the precipitation was completed after the completion of the reaction, the upper layer solution was removed, and the remaining reaction product was washed once with toluene. Dimethylanilinium tetrakis(pentafluorophenyl)borate (64 μmol) was added and reacted at 75° C. for 5 hours. After completion of the reaction, the reaction product was washed with toluene, washed again with hexane and then vacuum-dried to obtain a silica-supported metallocene catalyst in the form of solid particles.

Examples 1 to 4

Bulk-slurry polymerization of propylene was carried out using a continuous 2-stage loop reactor. For the bulk-slurry polymerization, the catalyst prepared in Preparation Example 3 was mixed with 20 wt % oil-grease (mixture in which mineral oil (KAYDOL, White Mineral Oil) and grease (WHITE PROTOPET, 1S Petrolatum) were mixed in a weight ratio of 2:1) and the mixed mud catalyst was used. The production amount per hour was about 40 kg, and detailed operation conditions were as shown in Table 1 below.

TABLE 1

|  | Temperature (° C.) | Pressure (kg/cm³) | Addition amount of catalyst (cc/hr) | Addition amount of propylene (ppm) | Addition amount of TEAL[1) (ppm) | Addition amount of hydrogen (ppm) |
|---|---|---|---|---|---|---|
| Example 1 | 65 | 35 | 5.5 | 40 | 50 | 25 |
| Example 2 | 65 | 35 | 16.3 | 40 | 50 | 250 |
| Example 3 | 60 | 35 | 4.6 | 40 | 50 | 40 |
| Example 4 | 65 | 35 | 4.1 | 40 | 50 | 220 |

[1)]TEAL: Triethylaluminium

COMPARATIVE EXAMPLE

SEETEC T3410 and SEETEC R3410 available from LG Chem Ltd. were used as Comparative Examples 1 and 2, respectively.

EXPERIMENTAL EXAMPLE

The following physical properties were measured using the polypropylene of Examples and Comparative Examples.

1) Mn, Mw, and MWD: The sample was dissolved in 1,2,4-trichlorobenzene containing 0.0125% of BHT using PL-SP260 at 160° C. for 10 hours and subjected to pretreatment. The number average molecular weight and the weight average molecular weight were measured at a temperature of 160° C. using PL-GPC 220. The molecular weight distribution is represented by the ratio between the weight average molecular weight and the number average molecular weight.

2) Melt Index (MFR, 2.16 kg): Measured at 230° C. under a load of 2.16 kg according to ASTM D1238 and shown in weight (g) of the polymer melted for 10 minutes.

3) Crystallization temperature (Tc) and melting point (Tm): The recrystallization temperature, melting point and melting heat of polypropylene were measured using a differential scanning calorimeter (DSC, device name: DSC 2920, manufacturer: TA Instrument). Specifically, the polymer was heated to 220° C., and that temperature was maintained for 5 minutes, and further cooled to 20° C., and then the temperature was increased again. At this time, the rate of rise and the rate of decrease in temperature were controlled to be 19° C./min.

4) Flexural modulus and flexural strength: The flexural modulus was measured according to ASTM D790.

The results are shown in Table 2 below.

As shown in Table 2, it was confirmed that the polypropylene of Examples according to the present invention maintained the stiffness at the same level while having lower melting point and crystallization temperature as compared with those of Comparative Examples.

The invention claimed is:

1. A polyethylene polypropylene having:

a melt index (MI), measured at 230° C. under a load of 2.16 kg according to ASTM D1238, of 4 to 60 g/10 min, a melting point (Tm) of 130° C. to 140° C., a flexural modulus, measured according to ASTM 790, of 9,000 to 18,000 kgf/cm², and a crystallization temperature of 80° C. to 105° C.

2. The polypropylene according to claim 1, wherein the polypropylene has a molecular weight distribution (Mw/Mn) of 2.5 to 3.5.

3. The polypropylene according to claim 1, wherein the polypropylene has a weight average molecular weight of 150,000 to 350,000.

4. The polypropylene according to claim 1, wherein the polypropylene is prepared by polymerizing propylene in the presence of a hybrid supported catalyst comprising a compound represented by the following Chemical Formula 1, a compound represented by the following Chemical Formula 2 and a support:

TABLE 2

|  | Example 1 | Example 2 | Example 3 | Example 4 | Comparative Example 1 | Comparative Example 2 |
|---|---|---|---|---|---|---|
| Mw(g/mol) | 265k | 272k | 270k | 191k | 215k | 209k |
| Mn(g/mol) | 83k | 94k | 91k | 66k | 54k | 60k |
| Mw/Mn | 3.2 | 2.9 | 3.0 | 2.9 | 4.0 | 3.5 |
| MI (g/10 min) | 8.5 | 6.4 | 9.4 | 15.6 | 7.0 | 7.1 |
| Tm(° C.) | 132.4 | 134.6 | 138.1 | 137.9 | 134.0 | 144.2 |
| Tc(° C.) | 80.7 | 88.1 | 89.6 | 93.6 | 97.8 | 106.0 |
| $C_2$ content | 2.4 | 1.9 | 1.4 | 1.5 | — | — |
| Flexural Modulus (kgf/cm²) | 9,253 | 10,439 | 10,578 | 10,751 | 8,893 | 10,118 |
| Flexural strength (%) | 311 | 344 | 347 | 355 | 287 | 324 |

[Chemical Formula 1]

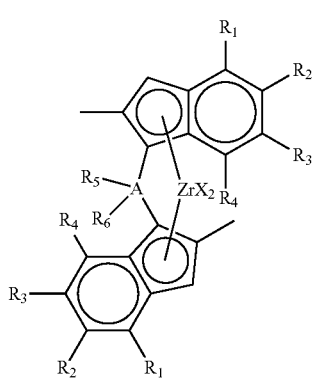

wherein in Chemical Formula 1,
X is a halogen, same as or different from each other,
$R_1$ is a $C_{6-20}$ aryl substituted with a $C_{1-20}$ alkyl,
$R_2$, $R_3$ and $R_4$ are each independently hydrogen, halogen, $C_{1-20}$ alkyl, $C_{2-20}$ alkenyl, $C_{1-20}$ alkylsilyl, $C_{1-20}$ silylalkyl, alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl,
A is carbon, silicon, or germanium,
$R_5$ is $C_{1-20}$ alkyl substituted with $C_{1-20}$ alkoxy, and
$R_6$ is hydrogen, $C_{1-20}$ alkyl, or $C_{2-20}$ alkenyl,

[Chemical Formula 2]

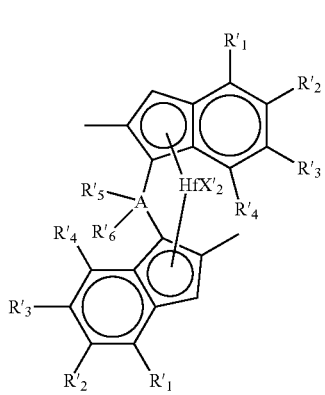

wherein in Chemical Formula 2,
X' is a halogen, same as or different from each other,
$R'_1$ is a $C_{6-20}$ aryl substituted with a $C_{1-20}$ alkyl,
$R'_2$, $R'_3$ and $R'_4$, are each independently hydrogen, halogen, $C_{1-20}$alkyl, $C_{2-20}$ alkenyl, $C_{1-20}$ alkylsilyl, $C_{1-20}$ silylalkyl, $C_{1-20}$ $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl,
A is carbon, silicon, or germanium,
$R'_5$ is a $C_{1-20}$ alkyl substituted with a $C_{1-20}$ alkoxy, and
$R'_6$ is hydrogen, a $C_{1-20}$ alkyl, or a $C_{2-20}$ alkenyl.

5. The polypropylene according to claim 4, wherein the hybrid supported catalyst further includes at least one of a compound represented by the following Chemical Formula 3, a compound represented by the following Chemical Formula 4 and a compound represented by the following Chemical Formula 5:

$$—[Al(R_{30})—O]_m—$$ [Chemical Formula 3]

wherein in Chemical Formula 3,
$R_{30}$ may be the same as or different from each other, and each independently a halogen; a hydrocarbon having 1 to 20 carbon atoms; or a halogen-substituted hydrocarbyl group having 1 to 20 carbon atoms, and
m is an integer of 2 or more, $$J[R_{31}]_3$$ [Chemical Formula 4]

wherein in Chemical Formula 4,
$R_{31}$ is as defined in Chemical Formula 3; and
J is aluminum or boron;

$$[E-H]^+[ZA_4]^-\ \text{or}\ [E]^+[ZA_4]^-$$ [Chemical Formula 5]

wherein in Chemical Formula 5,
E is a neutral or cationic Lewis base;
H is a hydrogen atom;
Z is a Group 13 element; and
A may be the same as or different from each other, and each independently an aryl group having 6 to 20 carbon atoms or an alkyl group having 1 to 20 carbon atoms in which at least one halogen is substituted or unsubstituted with halogen, $C_1$-$C_{20}$ hydrocarbon, alkoxy or phenoxy.

* * * * *